(12) United States Patent
Rice

(10) Patent No.: US 6,421,161 B1
(45) Date of Patent: Jul. 16, 2002

(54) FIBER MODULATOR AND ASSOCIATED METHOD

(75) Inventor: Robert Rex Rice, Simi Valley, CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/764,600

(22) Filed: Jan. 18, 2001

(51) Int. Cl.[7] .............................. G02F 1/03; G01B 9/02
(52) U.S. Cl. ...................................... 359/254; 356/350
(58) Field of Search ................................ 359/254, 261, 359/295; 430/321; 385/30; 356/350

(56) References Cited

U.S. PATENT DOCUMENTS

| | | | |
|---|---|---|---|
| 5,377,283 A | * 12/1994 | Blake et al. ................. 385/11 |
| 5,438,411 A | * 8/1995 | Kersey ....................... 356/350 |
| 5,561,675 A | 10/1996 | Bayon et al. |
| 5,647,036 A | * 7/1997 | Deacon et al. .............. 385/27 |
| 5,694,408 A | 12/1997 | Bott et al. |
| 5,742,423 A | 4/1998 | Ido et al. |
| 5,926,308 A | 7/1999 | Lee et al. |
| 6,047,095 A | * 4/2000 | Knoesen et al. ............. 385/30 |
| 6,141,465 A | * 10/2000 | Bischel et al. ............... 385/4 |
| 6,221,565 B1 | * 4/2001 | Jain et al. .................... 430/321 |

* cited by examiner

Primary Examiner—Ricky Mack
Assistant Examiner—Omar Hindi
(74) Attorney, Agent, or Firm—Alston & Bird LLP

(57) ABSTRACT

An optical modulator and an associated modulation method are provided that utilize an optical fiber as the active medium such that the resulting fiber modulator is relatively inexpensive, but maintains high performance standards. The fiber modulator includes a core and a cladding surrounding the core which collectively form a longitudinally extending optical fiber capable of supporting the propagation of optical signals. The fiber modulator also includes first and second regions within the cladding and extending longitudinally therealong for establishing an internal bias electrical field across the core. The first and second regions are disposed on opposite sides of the core and have positive and negative electrical charges, respectively. The fiber modulator further includes first and second electrodes disposed on the cladding proximate the first and second regions, respectively, and extending longitudinally therealong. By applying electrical signals, such as radio frequency (RF) signals, to the first and second electrodes, the optical signals propagating through the core of the optical fiber can be linearly phase modulated. The optical fiber may have a rectangular shape in lateral cross section with a pair of opposed major surfaces and a pair of opposed minor surfaces. In this instance, the first and second regions and the first and second electrodes are all generally disposed proximate a respective major surface of the optical fiber.

15 Claims, 1 Drawing Sheet

FIBER MODULATOR AND ASSOCIATED METHOD

FIELD OF THE INVENTION

The present invention relates generally to optical modulators and associated modulation methods and, more particularly, to an optical modulator utilizing an optical fiber as the active medium and an associated modulation method.

BACKGROUND OF THE INVENTION

An increasing number of telecommunications, computer and other networks rely upon optical fibers, as opposed to electrical wiring, for signal transmission. Each of these optical networks typically includes a number of optical modulators for encoding the data to be transmitted via the optical fibers so that the encoded data can ride upon an optical carrier signal. As such, optical modulators are in great demand with increasing emphasis being placed upon the speed at which the optical modulator operates and the cost of the optical modulator.

While optical modulators are widely utilized in conventional optical networks, the demand for optical modulators will likely grow as internet service providers offer an increasing number of wideband services to both businesses and residential customers. Unfortunately, the conventional optical modulators that are capable of modulating signals over a wide frequency band are disadvantageously expensive, as described in more detail below. In fact, optical modulators may be the most costly components of some fiber optic communication systems.

A conventional optical modulator includes a single crystal substrate formed of a ferroelectric material that lacks internal symmetry, such as single crystal lithium niobate ($LiNbO_3$). A ferroelectric material possesses a spontaneous dielectric polarization and, consequently, also exhibits a linear electrooptic effect, i.e., a Pockels effect. As a result, the refractive index of a single crystal substrate exhibiting a linear electrooptic effect changes linearly with an applied electric field. Accordingly, optical signals propagating through an in-diffused single mode waveguide fabricated on a single crystal substrate exhibiting a linear electrooptic effect can be phase modulated by applying an appropriate electric field. Typically, the electric field is created by applying an electrical signal to electrodes on opposite sides of the single crystal substrate.

An optical modulator, such as an optical modulator fabricated from single crystal lithium niobate, can be characterized by its half-wave switching voltage $V_S$ and its electrical bandwidth $\Delta f$. The half-wave switching voltage is the voltage that must be applied across the single crystal substrate in order to induce a phase shift of $\pi$. It is generally desirable for the half-wave switching voltage to be less than about 10 volts such that solid state driver amplifiers can be utilized to create the electric field across the single crystal substrate. In addition, the electrical bandwidth of an optical modulator is the frequency band over which the modulation response remains within 3 dB of the peak value. For example, the electrical bandwidth of a conventional optical modulator is in the tens of gigahertz.

In order to fabricate an optical modulator, the single crystal material is drawn from a high temperature melt according to a Czochralski process. The crystal is then poled by annealing the crystal at elevated temperatures in the presence of an applied electrical field that aligns the ferroelectric domains in the same direction. The crystal is next cut into thin wafers and the major surfaces of each wafer are polished to an optical grade finish. Utilizing photolithography, a mask that defines the desired waveguide pattern is then formed upon a polished surface of the substrate. After processing the photoresist, titanium metal is typically deposited on the surface and is then in-diffused at high temperatures to form the single mode waveguides. Metal electrodes are then deposited on the polished surface of the substrate in the same pattern of the waveguides. Since a plurality of modulators can be formed upon a single substrate, the individual optical modulators are then cut or otherwise separated from the remainder of the wafer. The optical modulator is then packaged with fiber optic pigtails and radio frequency (RF) connections in a hermetic package with corresponding single mode optical fiber connectors.

Although the resulting optical modulator can reliably phase modulate the optical signals transmitted via the single mode waveguides within an optical network, the process for fabricating a conventional optical modulator requires precise dimensional control and is relatively expensive. As such, the resulting optical modulators also are disadvantageously expensive, especially relative to other components within an optical network. As such, it would be desirable to provide reliable optical modulators that can be fabricated in a less expensive manner.

SUMMARY OF THE INVENTION

An optical modulator and an associated modulation method are therefore provided that utilize an optical fiber as the active medium such that the resulting fiber modulator is less expensive, but maintains high performance standards. In this regard, the fiber modulator of the present invention includes a core having a first index of refraction and a cladding surrounding the core and having a second index of refraction that is less than the first index of refraction. As such, the core and the surrounding cladding generally form a longitudinally extending optical fiber capable of supporting the propagation of optical signals through the core thereof. The fiber modulator also includes first and second regions within the cladding and extending longitudinally therealong for establishing an internal bias electrical field across the core. The first and second regions are therefore disposed on opposite sides of the core and have positive and negative electrical charges, respectively. The fiber modulator further includes first and second electrodes disposed on the cladding proximate the first and second regions, respectively, and extending longitudinally therealong. By applying electrical signals, such as radio frequency (RF) signals, to the first and second electrodes, the optical signals propagating through the core of the optical fiber can be linearly phase modulated.

In one advantageous embodiment, the optical fiber and, more particularly, the cladding has a rectangular shape in lateral cross section. As such, the optical fiber has a pair of opposed major surfaces and a pair of opposed minor surfaces. In this embodiment, the first and second regions and the first and second electrodes are all preferably disposed proximate a respective major surface of the optical fiber. For example, the first region and the first electrode can be disposed proximate a first major surface and the second region and the second electrode can be disposed proximate an opposed second major surface.

Preferably, the optical fiber is a single mode fiber such that the core is adapted to support optical signal propagation in a single mode. In addition, the optical fiber may serve not only as the active medium of a fiber modulator, but also as an amplifier, i.e., a fiber amplifier. In this instance, the core may be doped with a rare earth dopant to thereby amplify the optical signals propagating therethrough if the optical fiber is also appropriately pumped.

In operation, an internal DC bias electrical field is established across the core. According to the present invention, the internal DC bias electrical field is established by the first and second regions that have positive and negative electrical charges, respectively, and that are positioned on opposite sides of the core. While the internal DC bias electrical field is applied across the core, electrical signals are also applied to the electrodes that extend lengthwise along opposite sides of the optical fiber to thereby linearly phase modulate the optical signals propagating through the core of the optical fiber. Typically, the electrical signals applied to the electrodes are RF signals. In one embodiment, for example, the RF signals can be applied to one end of the electrodes such that the RF signals propagate lengthwise along the electrodes concurrent with the propagation of the optical signals through the core of the optical fiber. Preferably, the electrical signals that are applied to the electrodes are selected such that the resulting electrical field established by the electrical signals is smaller than the internal DC bias electrical field. As such, the internal DC bias electrical field can induce a linear electrooptic effect within an optical fiber that would otherwise exhibit a quadratic electrooptic effect, i.e., a Kerr effect. As a result of the linear electrooptic effect, the smaller electrical field created by the electrical signals applied to the electrodes serves to linearly modulate the optical signals propagating through the optical fiber. Concurrent with the modulation of the optical signals, the optical signals can be amplified if the core of the optical fiber has been appropriately doped with a rare earth dopant and is optically pumped.

Since it is premised upon optical fiber technology, the fiber modulator of the present invention can therefore be fabricated at much lower cost than conventional optical modulators. As such, the resulting fiber modulator generally is less expensive. However, a fiber modulator of the present invention that includes an optical fiber as the active medium still maintains high performance levels with respect to the linear phase modulation of the optical signals propagating therealong.

BRIEF DESCRIPTION OF THE DRAWINGS

Figure 1:
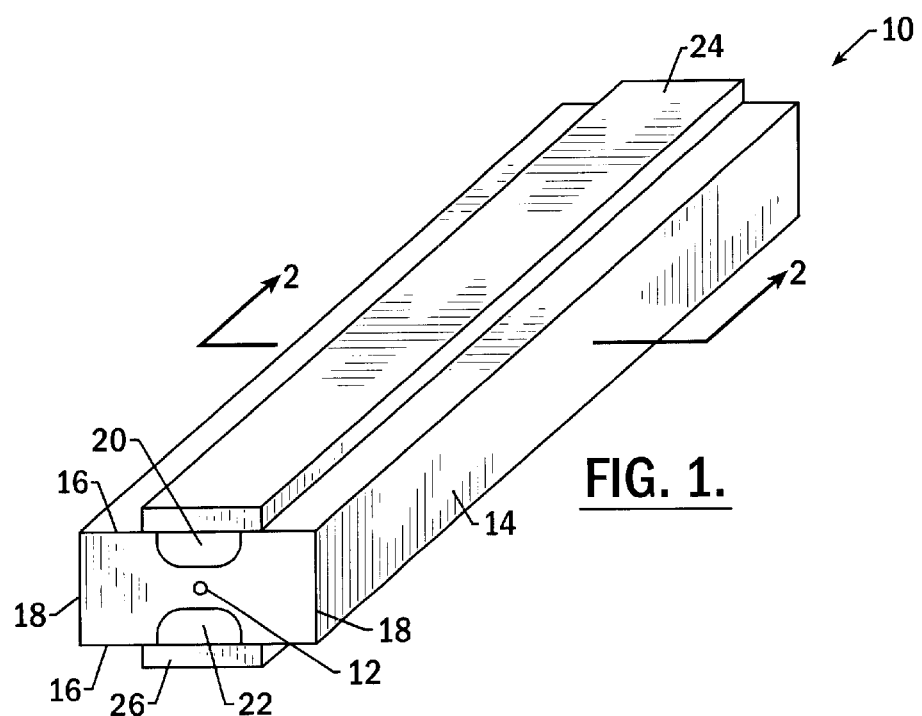
Figure 2:
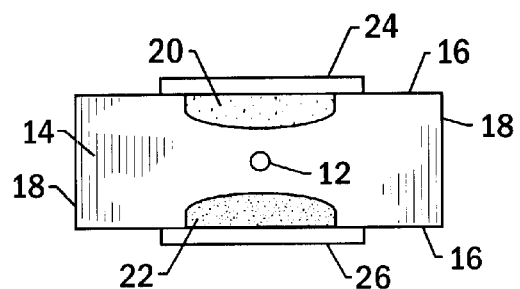

Having thus described the invention in general terms, reference will now be made to the accompanying drawings, which are not necessarily drawn to scale, and wherein:

FIG. 1 is a perspective view of a fiber modulator according to one embodiment of the present invention; and FIG. 2 is a cross-sectional view of the fiber modulator of FIG. 1 taken along line 2—2.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Only single crystal structures that lack internal symmetry, such as single crystal lithium niobate as described above, exhibit a linear electrooptic effect, i.e., a Pockels effect. However, all transparent dielectric materials exhibit a quadratic electrooptic effect, i.e., a Kerr effect. For purposes of explanation, the linear electrooptic effect can be considered to be the quadratic electrooptic effect biased by the spontaneous polarization in a ferroelectric single crystal material. Although not wishing to be bound by theory, it is therefore suggested that a permanent electric field applied to a transparent dielectric material that otherwise exhibits a quadratic electrooptic effect can induce a linear electrooptic effect.

By way of example, a transparent dielectric material, such as a glass or liquid, generally has a non-linear refractive index n that is defined as follows:

$$n = n_1 + n_2 E^2 \tag{1}$$

wherein $n_1$ is the linear refractive, E is the applied electric field and $n_2$ is the Kerr constant. As such, the term $n_2 E^2$ is the nonlinear portion of the refractive index. According to the present invention, a relatively large internal DC bias electrical field E can be applied across a transparent material that otherwise exhibits a quadratic electrooptic effect such that the application of a relatively small application δE thereafter produces a linear modulation of the refractive index δn. In this instance, the cumulative refractive index is n+δn in instances in which the total applied electrical field is E+δE. As such, equation 1 can be rewritten as follows:

$$n + \delta n = n_1 + n_2(E + \delta E)^2 = n_1 n_2 \ (E^2 + 2E\delta E + \delta E^2) \tag{2}$$

Since the term $\delta E^2$ is small, this term can be eliminated and the equation can then be solved for δn as follows:

$$\delta n = 2n_2 E \delta E \tag{3}$$

As illustrated by equation 3, the refractive index of a transparent material, such as an optical fiber, varies linearly in response to the electrical field created by relatively small electrical signals once the transparent material has already been strongly biased by a relatively large internal DC bias electrical field E.

According to the present invention, a fiber modulator 10 is provided that includes an active medium comprised of a transparent material in the form of an optical fiber and, more preferably, a single mode optical fiber. As shown in FIGS. 1 and 2, the optical fiber includes a single mode core 12 and a cladding 14 that surrounds the core. In order to appropriately guide the optical signals through the core, the core has a first index of refraction that is greater than the second index of refraction of the cladding.

As depicted in FIG. 1, the optical fiber and, as a result, both the core 12 and the cladding 14 extend in a longitudinal direction. According to one advantageous embodiment of the present invention, the optical fiber and, more particularly, the cladding has a rectangular shape in lateral cross-section. Although the optical fiber could be square in lateral cross-section, the rectangularly shaped optical fiber generally includes a pair of opposed major surfaces 16 and a pair of opposed minor surfaces 18. In this regard, it is noted that while the embodiment of the fiber modulator 10 depicted in FIGS. 1 and 2 includes major and minor surfaces that intersect at a right angle, the corners of the optical fiber and, more particularly, the corners of the cladding can be rounded while still being considered to have a rectangular shape in lateral cross-section for purposes of the present invention. Even though the cladding has a rectangular shape in lateral cross-section, the core is typically circular in lateral cross section.

The core 12 and the cladding 14 of the optical fiber can be formed from various materials as known to those skilled in the art. However, in one advantageous embodiment, the core can be formed of silica doped with germanium and the cladding can be formed of undoped silica.

The fiber modulator 10 of the present invention also includes first and second regions 20, 22 having positive and negative electrical charges, respectively. As shown, the first and second regions are disposed within the cladding 14 on opposite sides of the core 12. More particularly, the first and second regions are preferably disposed proximate a respective major surface 16 of the optical fiber. In the embodiment depicted in FIGS. 1 and 2, for example, the first and second regions are preferably disposed within medial portions of respective major surfaces of the optical fiber and are generally in alignment with one another. As shown, the first and second regions are preferably centered relative to the respective major surfaces of the optical fiber so as to be disposed on opposite sides of the core.

As described below, the first and second regions 20, 22 are generally implanted into opposite sides of the cladding 14 and, as such, generally have a U-shape with substantially linear sides and arcuate bottom that bows inwardly toward the core 12. In this regard, each of the first and second regions is preferably sized the same and has a width in the direction of the respective major surface that is much broader than the diameter of the core.

The first and second regions 20, 22 include an electrical charge of the appropriate polarity such that the first region has a positive electrical charge and the second region has a negative electrical charge. Typically, the first and second regions are formed such that the positive and negative electrical charges, respectively, are substantially equal. As a result of the positive and negative electrical charges, the first and second regions establish an internal DC bias electrical field across the core 12. Generally, the internal DC bias electrical field has a relatively large magnitude, such as 10,000, 20,000 or more volts per centimeter. Although not wishing to be bound by theory, it is believed that the relatively large internal DC bias electrical field created by the first and second regions induces a linear electrooptic effect within the transparent material, i.e., within the optical fiber, that would otherwise exhibit a quadratic electrooptic effect.

The fiber modulator 10 of the present invention also includes first and second electrodes 24, 26 disposed on the optical fiber and, more particularly, on the cladding 14 proximate the first and second regions 20, 22, respectively. As shown in FIGS. 1 and 2, the first and second electrodes preferably overlie the first and second regions, respectively. In addition, the first and second electrodes are preferably somewhat wider than the first and second regions, respectively, such that each electrode spans a greater percentage of the major surface 16 than the respective region. While the electrodes can be formed of various conductive materials, the electrodes are typically formed of a metal, such as gold with an adhesion layer formed of titanium and platinum.

In order to modulate the optical signals propagating through the core 12 of the optical fiber by altering the phase of the optical signals, electrical signals and, more typically, RF signals are applied to the first and second electrodes 24, 26. The electrical signals applied to the electrodes create an additional electrical field $\delta E$. This additional electrical field $\delta E$ is substantially smaller than the internal DC bias electrical field established by the first and second regions 20, 22. For example, the electrical field established by the electrical signals applied to the electrodes is typically no more than about 10% of the internal DC bias electrical field.

By applying a voltage $\delta V$ to the electrodes 24, 26 that extend along an optical fiber of length L and thickness d, a phase shift $\delta \Phi$ is introduced that is defined as:

$$\delta \Phi = (4\pi n_2 LE/\lambda d)\delta V \quad (4)$$

In addition to the internal DC bias electrical field, the phase shift is also partially based upon the aspect ratio of the optical fiber which is defined as the ratio of the length L of the optical fiber to the thickness d of the optical fiber, i.e., the distance between the opposed major surfaces 16 of the optical fiber. Advantageously, the aspect ratio and, in turn, the phase shift can be quite large. For example, the length of the optical fiber can easily be 30 centimeters and the thickness of the optical fiber can be 30 micrometers such that the aspect ratio is approximately $10_4$. Additionally, the internal DC bias electrical field is also generally sizable. As such, substantial phase shifts can be generated with the application of only a relatively small voltage $\delta V$ to the opposed electrodes.

Based upon equation (4) set forth above, the half-wave voltage $V_s$ for the fiber modulator 10 of the present invention that is necessary in order to induce a phase shift of $\pi$ can be defined as:

$$V_s = \lambda d/4n_2 LE \quad (5)$$

In instances in which the half-wave voltage $V_s$ is applied across a section of the electrodes 24, 26 that extends along a length of the optical fiber that is equal to the thickness of the optical fiber, the half-wave voltage $V_s$ set forth in equation (5) can be rewritten as:

$$V_s = \lambda/4n_2 E \quad (6)$$

The fiber modulator 10 of the present invention can therefore advantageously linearly modulate the optical signals propagating therealong due to the linear relationship between the voltage applied to the opposed electrodes 24, 26 and the resulting phase shift. In order to provide this linear modulation, an internal DC bias electrical field must first be established across the core in order to induce the linear electrooptic effect within the optical fiber that otherwise would exhibit a quadratic electrooptic effect.

In operation, an internal DC bias electrical field is therefore established across the core 12. As described above, the internal DC bias electric field is established by the first and second regions 20, 22 within the cladding 14 on opposite sides of the core that have positive and negative electrical charges, respectively. While the internal DC bias electric field is established across the core, electrical signals, such as RF signals, are applied to the electrodes 24, 26 in order to phase modulate the optical signals propagating through the core. In one advantageous embodiment, the RF signals are applied to one end of the electrodes. The RF signals then propagate along the length of the optical fiber at a velocity of $C/\sqrt{K}$ wherein c is the speed of light and K is the relative dielectric constant. Since the dielectric constant of a common optical fiber formed of germanonsilicate glass is about 2.5, the propagation of the RF signal lengthwise along the electrodes and the propagation of optical signals through the core of the optical fiber are nearly synchronized.

In addition to serving as the active medium of the fiber modulator 10 of the present invention, the optical fiber can also serve as a fiber amplifier for amplifying the optical signals. In this regard, the core 12 would preferably be doped with rare earth ions and optically pumped as known to those skilled in the art so as to amplify the optical signals propagating therealong. Thus, the optical fiber can serve as a dual-function component in order to simultaneously amplify and modulate optical signals propagating therealong.

Generally, the optical refractive index is different for light polarized parallel and perpendicular to the internal DC bias electric field. As such, the fiber modulator 10 can preserve the polarization of the optical signals being input into the optical fiber in either of these two principle directions.

In order to fabricate the fiber modulator 10, an optical fiber preform having a circular core 12 and a cladding 14 surrounding the core that has a rectangular shape is provided. As known to those skilled in the art, an optical fiber preform is provided that includes a core with a greater index of refraction than that of the surrounding cladding. An optical fiber could then be drawn from the preform that preserves the rectangular shape. By appropriate selection of the cross-sectional dimensions of the optical fiber and the respective indices of refraction of the core and cladding, the optical fiber can be designed to be a single mode fiber that supports the propagation of optical signals in only a single mode at the design wavelength $\lambda$. For example, the core may have a diameter of 10 micrometers or less, while the cladding has a diameter of several tens of micrometers. Either during or following the drawing process, the first and second regions 20, 22 having positive and negative electrical charges, respectively, are formed. Typically, ions having a positive charge are injected on one side of the optical fiber and ions having a negative charge are injected on the opposed side of the optical fiber. For example, the ions can be injected by means of an ion implantation or electron injection process. Metal can then be deposited on the opposed sides of the optical fiber proximate one of the first and second regions in order to form the electrodes 24, 26 that serve as RF waveguides in one embodiment.

As will be apparent from the foregoing description, the fiber modulator 10 of the present invention is premised upon fiber optic technology and can therefore be formed in a relatively efficient and inexpensive manner such that the cost of the resulting fiber modulator is reduced relative to conventional optical modulators. However, the fiber modulator of the present invention maintains high performance standards and can reliably phase modulate the optical signals propagating along the optical fiber by applying appropriate electrical signals to the opposed electrodes 24, 26.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber modulator comprising:
   a core having a first index of refraction;
   a cladding surrounding said core and having a second index of refraction that is less than the first index of refraction;
   first and second regions within said cladding on opposite sides of said core, said first and second regions having positive and negative electrical charges, respectively, for establishing an internal DC bias electrical field across said core; and
   first and second electrodes disposed on said cladding proximate said first and second regions, respectively, for applying time-varying electrical signals to modulate optical signals propagating through said core, wherein the time-varying electrical signals applied via said first and second electrodes are in addition to the internal DC bias electrical field established by the positive and negative electrical charges maintained by said first and second regions.

2. A fiber modulator according to claim 1 wherein said core and cladding extend in a longitudinal direction, and wherein said cladding has rectangular shape in lateral cross section.

3. A fiber modulator according to claim 2 wherein said cladding has a pair of opposed major surfaces and a pair of opposed minor surfaces, and wherein said first and second regions and said first and second electrodes are all disposed proximate respective major surfaces of said cladding.

4. A fiber modulator according to claim 1 wherein said core and cladding extend in a longitudinal direction, and wherein said first and second regions and said first and second electrodes all also extend in the longitudinal direction.

5. A fiber modulator according to claim 1 wherein said core is adapted to support optical signal propagation in a single mode.

6. A fiber modulator according to claim 1 wherein said core is doped with a rare earth dopant such that said core is capable of amplifying the optical signals propagating therethrough in response to optical pumping.

7. A fiber modulator comprising:
   a longitudinally extending optical fiber comprising a core and a cladding surrounding said core, said optical fiber having a rectangular shape in lateral cross section;
   first and second regions within said cladding and extending longitudinally therealong, said first and second regions disposed on opposite sides of said core and having positive and negative electrical charges, respectively; and
   first and second electrodes disposed on said optical fiber and extending longitudinally therealong, said first and second electrodes disposed proximate said first and second regions, respectively,
   wherein the positive and negative electrical charges maintained by said first and second regions are independent of any electrical signals applied to said first and second electrodes.

8. A fiber modulator according to claim 7 wherein said optical fiber has a pair of opposed major surfaces and a pair of opposed minor surfaces, and wherein said first and second regions and said first and second electrodes are all disposed respective major surfaces of said optical fiber.

9. A fiber modulator according to claim 7 wherein said optical fiber is adapted to support optical signal propagation in a single mode.

10. A fiber modulator according to claim 7 wherein said core is doped with a rare earth dopant such that said core is capable of amplifying the optical signals propagating therethrough in response to optical pumping.

11. A method of modulating optical signals propagating along an optical fiber having a core and a cladding surrounding the core, the method comprising:

establishing an internal DC bias electrical field across the core, establishing the internal DC bias electrical field comprising providing first and second regions within the cladding on opposite sides of the core that have positive and negative electrical charges, respectively; and applying time-varying electrical signals to electrodes extending lengthwise along the cladding while the internal DC bias electrical field is also established across the core, thereby modulating the optical signals propagating through the core.

12. A method according to claim 11 wherein applying electrical signals comprises applying RF signals to the electrodes.

13. A method according to claim 12 wherein applying RF signals comprises applying RF signals to one end of the electrodes such that the RF signals propagate lengthwise along the electrodes concurrent with the propagation of optical signals through the core.

14. A method according to claim 11 wherein applying electrical signals comprises selecting the electrical signals to be applied to the electrodes such that an electrical field established by the electrical signals applied to the electrodes is smaller than the internal DC bias electrical field.

15. A method according to claim 11 further comprising optically pumping the core in order to amplify the optical signals propagating through the core concurrent with the modulation of the optical signals.

* * * * *